United States Patent [19]

Curtis

[11] Patent Number: 5,108,059
[45] Date of Patent: Apr. 28, 1992

[54] ARTICLE RESTRAINER

[76] Inventor: Patrick A. Curtis, 1732 Church St., P.O. Box 750, Holbrook, N.Y. 11741

[21] Appl. No.: 669,848

[22] Filed: Mar. 1, 1991

[51] Int. Cl.[5] .......................................... A47G 23/02
[52] U.S. Cl. ................................. 248/146; 248/311.2
[58] Field of Search ............ 248/146, 148, 149, 311.2; 224/275, 277, 42.42 R, 42.45 R; 220/85 H, 476, 480, 481; 211/73

[56] References Cited

U.S. PATENT DOCUMENTS

| | | | |
|---|---|---|---|
| 2,980,377 | 4/1961 | Nielsen | 248/146 X |
| 3,163,287 | 12/1964 | Barnett | 224/42.42 R X |
| 4,040,549 | 8/1977 | Sadler | 220/85 H X |
| 4,721,216 | 1/1988 | Kinder | 248/311.2 X |
| 4,801,060 | 1/1989 | Thompson | 224/275 |
| 4,821,931 | 4/1989 | Johnson | 224/42.42 R |
| 4,846,382 | 7/1989 | Foultner | 224/277 X |
| 4,941,635 | 7/1990 | Lan | 248/311.2 X |
| 5,029,720 | 7/1991 | Bridges | 224/42.42 R X |

*Primary Examiner*—J. Franklin Foss
*Attorney, Agent, or Firm*—Edwin D. Schindler

[57] ABSTRACT

An article restrainer is disclosed which includes a first, inner segment made of a flexible, high-surface friction material, preferably, high density, cross-linked polyethylene, having a circular cut-out therein capable of receiving an article or circular or irregular shape. A second, outer segment with a lower surface made of a high-density, cross-linked poloyethylene having a cut-out therein is also included. The cut-out of the second segment has the shape of a rectangle with at least two opposing sides of the rectangle each having a partial circular portion which forms a complete imaginary circle with the rectangular portion being capable of receiving an article of rectangular shape, or of irregular shape, and the partial circular portions, in combination with one another, being capable of receiving an article of circular shape or irregular shape; the first, inner segment being capable of being retained within the cut-out of the second, outer segment. An adhesive layer is included on, at least, the lower surface of the outer segment for affixing said article restrainer to a surface. Other embodiments of the invention are also enclosed.

5 Claims, 2 Drawing Sheets

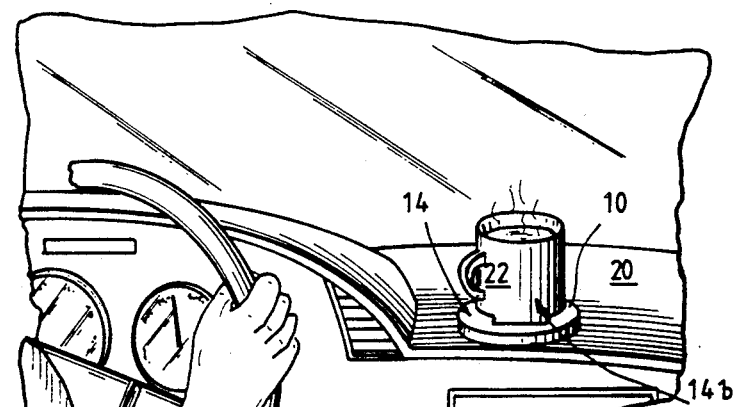
Fig.2
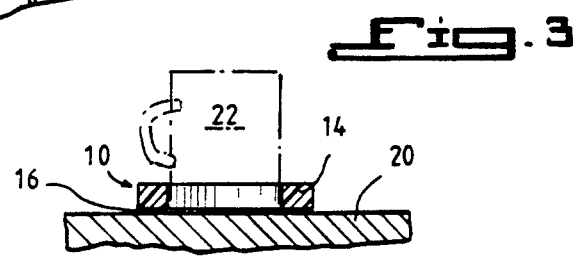
Fig.3
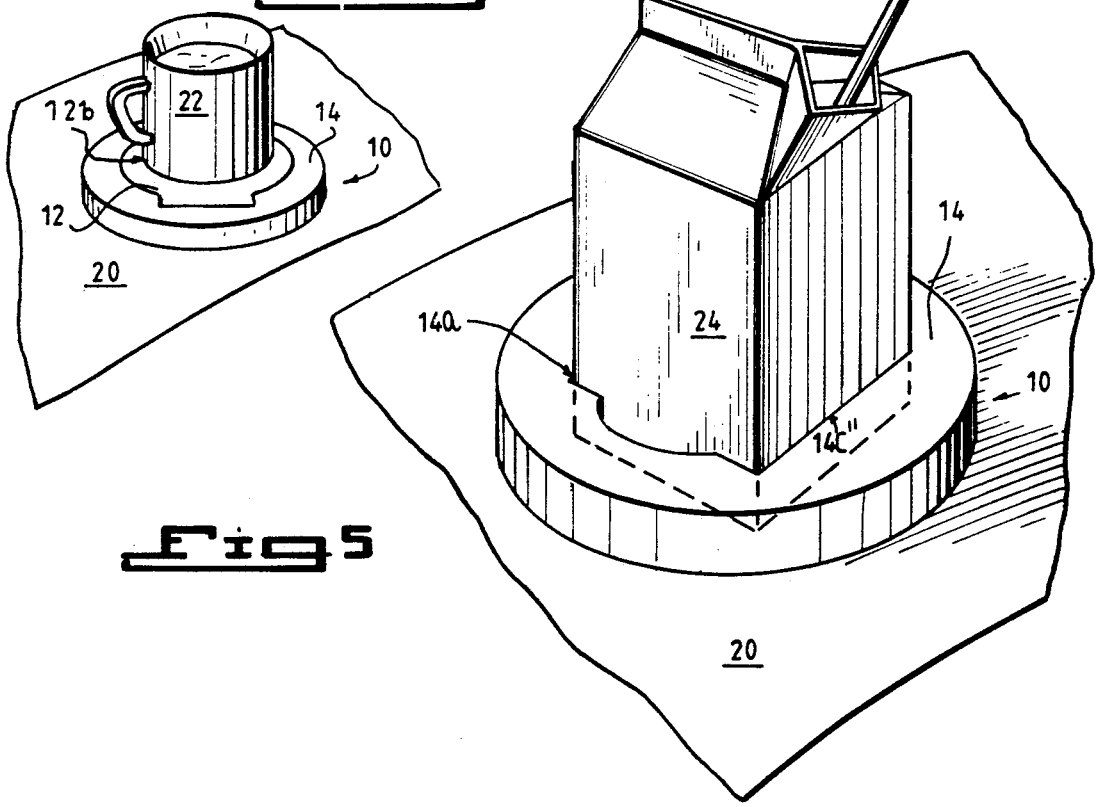
Fig.4
Fig.5

ARTICLE RESTRAINER

BACKGROUND OF THE INVENTION

1. Technical Field of the Invention

The present invention relates, generally, to an article holder, for example, a container holder. More particularly, the present invention relates to a container holder which is readily capable of retaining in place circular containers, such as cups, as well as rectangular containers.

As will be explained in greater detail hereinafter, the container holder of the invention is made of a flexible, high-surface friction material and is, preferably, made of high density (either open cell or closed cell) cross-linked polyethylene. The density of this material is, preferably, about 3 lbs./sq. ft. The percentage of cross-linkage is, preferably, about 40%. This material provides the container holder of the invention with a "gripping" capability, which is neither disclosed nor suggested by the prior art.

The present invention further includes a lower surface adhesive which allows the container holder to be securely set in place. This is particularly useful for setting the container in place on, for example, the dashboard of an automobile so that the container is secured in a fixed place during movement of the vehicle. While the container holder of the present invention is of particular use in a motor vehicle, it should be understood that neither the concept nor scope of the appended claims are intended to be interpreted in such a limiting fashion.

2. Description of the Prior Art

The prior art is known to include several references which generally relate to coasters, cup supports and cup holders, etc. Representative of such prior art are the following patent references known to the inventor: L. Dore, U.S. Pat. No. 2,727,645, issued Dec. 20, 1955; H. Stoffel, U.S. Pat. No. 3,120,077, issued Feb. 4, 1964; L. McCall, Jr., U.S. Pat. No. 3,482,809, issued Dec. 9, 1969; B. Lindenbaum, U.S. Pat. No. 3,945,491, issued Mar. 23, 1976; C. Sadler, U.S. Pat. No. 4,040,549, issued Aug. 9, 1977; and, J, Zelbey, U.S. Pat. No. 4,127,211, issued Nov. 28, 1976.

Of the foregoing patent citations known to the inventor, the closest prior art is believed to be L. Dore, U.S. Pat. No. 2,727,645. This citation discloses a cup holder with a flexible tip which is indented against a cup to be held in place. The Dore article, however, is not made of a flexible, high-surface friction material, such as, for example, high density, cross-linked polyethylene and, therefore, does not afford a gripping capability. In addition, the Dore article includes a base, unlike the present invention, which allows for the collection of condensation; a particularly undesirable feature of such type of coasters.

None of the foregoing citations disclose or suggest a container holder which may readily hold containers of both circular and rectangular shape, in their preferred embodiments, to, for example, the dashboard of a motor vehicle in addition, of course, to numerous other uses. Further, it should be recognized that the present invention, because of the flexible material from which it is made, is also capable of retaining containers are not merely recentangular or circular. The present invention, for example, unlike the prior art, is capable of retaining hexagonal, pentagonal and other irregularly-shaped containers as well.

SUMMARY OF THE INVENTION

It is, therefore, an object of the present invention to provide a container holder which is capable of retaining in place containers having either a circular shape, a rectangular shape or some irregular shape.

It is a further object of the present invention to provide a container holder which provides a gripping action to the container being retained for a more secure hold.

It is, yet, a further object of the present invention, to provide a container holder which fails to promote condensation and avoids collection of the same.

It is an additional object of the present invention to provide a container holder which is especially designed for use in any type of transport movement.

It is a further object of the present invention to provide a container holder which overcomes the numerous disadvantages inherent in the prior art.

The foregoing and related objects are accomplished by a container holder which, in a preferred embodiment, includes a first, inner segment which has a circular cut-out in the center thereof. This circular cut-out is capable of retaining circular containers of substantially the same shape, as well as irregularly shaped containers because of the flexible material from which it is made. The first, inner segment is contained within a second, outer segment. This is accomplished by providing the outer perimeter of the inner segment with a shape which complements the shape of an inner cut-out of the second, outer segment.

The shape of the inner cut-out of the outer segment is preferably that of a rectangle with a partial circular portion in the two opposite sides of greater length of the rectangle. The preferred shape of the rectangle should be substantially that of a standard rectangular container so that a container of such shape could be retained therein. The partial circular portions contained within two sides of the rectangle, as described above, form a complete, imaginary circle for retaining circular containers therein. The circular containers to be retained by the outer segment will have a large diameter than those retained by the inner segment.

It should be recognized that cut-out of the inner segment may be provided with a cut-out shape which is similar in portion to that of the cut-out of the outer segment. Additionally, more than two such segments may be provided, though two is probably reasonable and is preferred. Throughout this Specification, it should be understood that reference to two segments will generally include the possibility of more than two segments, as well.

In addition, it is claimed by the inventor that a single segment having a cut-out shaped, as described above, for the outer segment constitutes a separately patentable embodiment of the present invention in and of itself.

The segments of the present invention are made of a flexible, high-surface friction material, such as, preferably, high density, cross-linked polyethylene and may be of either open cell or closed cell. This preferred material reduces condensation and imparts a gripping tendency by the invention upon the containers so retained in the appropriate cut-outs of the segments.

Finally, all segments of the invention are provided with an adhesive on their lower surface for retention upon another surface, such as the dashboard of a motor vehicle. The type of adhesive utilize would depend upon the type of surface to which the container holder of the present invention is intended to be secured to. Any conventional and commercially available adhesive would be suitable for use in connection with the present invention, within the foregoing guideline.

Other objects and features of the present invention will be described in further detail hereinafter in combination with the accompanying drawing figures. It should, however, be understood that the accompanying drawing figures are intended to illustrate one or more preferred embodiments of the present invention and are not intended as a means for defining the scope of the invention or appended claims.

BRIEF DESCRIPTION OF THE DRAWINGS FIGURES

In the drawing, wherein similar reference numerals denote similar features throughout the several views:

FIG. 2 is a prospective view of the container holder of FIG. 1, in complete form, placed on the dashboard of an automobile and retaining a cup therein;

FIG. 3 is an elevational view, taken in cross-section, of the container holder of FIG. 2.

FIG. 4 is a prospective view of the container holder of FIG. 2, retaining the cup therein, in the circular cut-out of the first, inner segment of the container holder of the present invention; and, FIG. 5 is a prospective view of the container holder of the present invention affixed to a surface and retaining a rectangular container in the cut-out of the second, outer segment.

DETAILED DESCRIPTION OF THE DRAWING AND PREFERRED EMBODIMENTS

Figure 1:
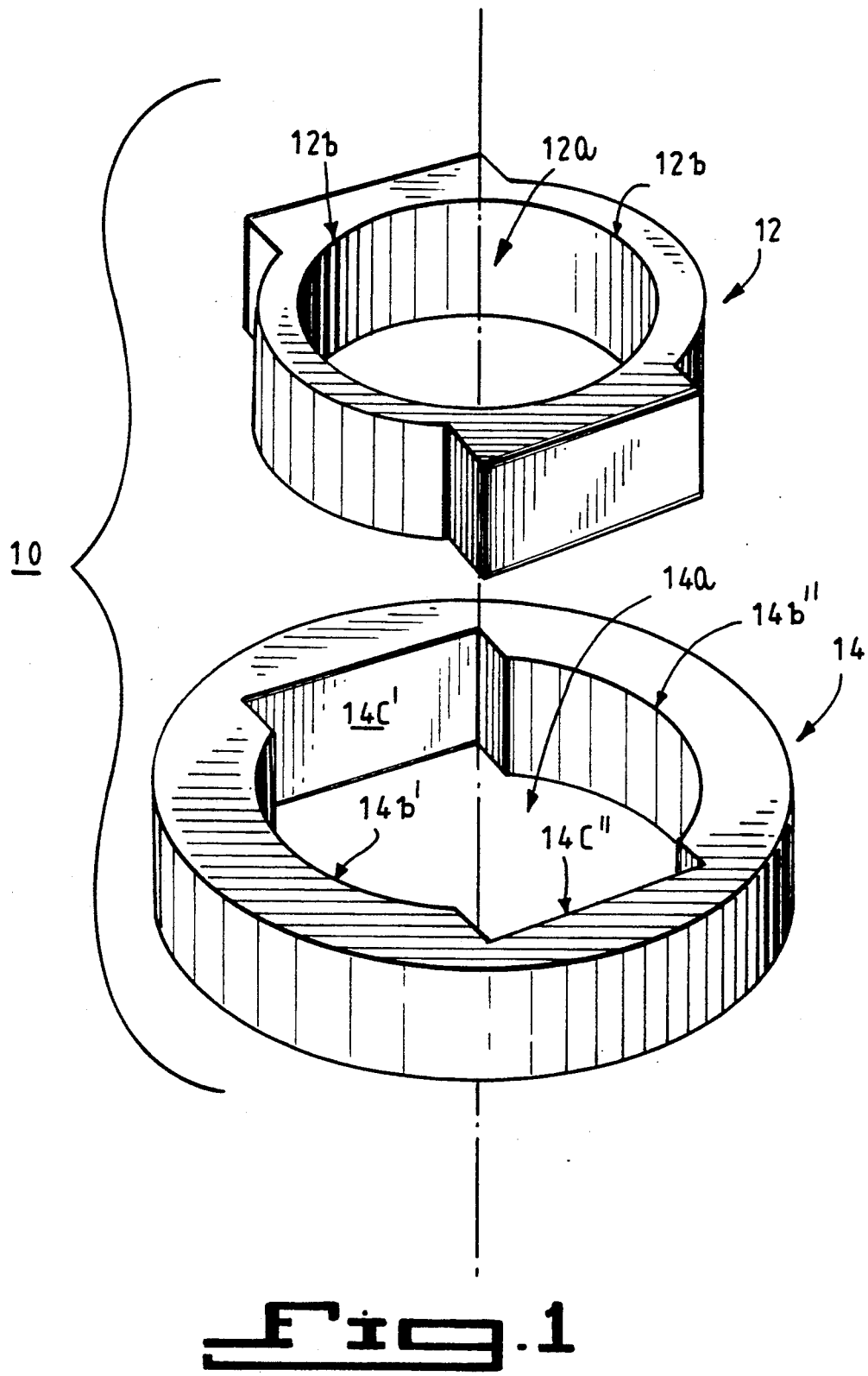
FIG. 1 is a prospective view of the separated preferred segments of the container holder of the present invention.

Turning now, in detail, to an analysis of the accompanying drawing figures, FIG. 1 is a prospective view of the separate segments comprising container holder 10. In its preferred embodiment, container holder 10 includes a first, inner segment 12 and a second, outer segment 14. Inner segment 12 includes a circular cut-out 12a in the center thereof. Circular cut-out 12a is capable of retaining circular containers of substantially the same shape (as best illustrated in FIG. 4), as well as irregularly-shaped containers, such as containers having a hexagonal shape.

The first, inner segment 12 is contained within a second, outer segment 14. This is accomplished by providing the outer perimeter 12b of the inner segment 12 with a shape which complements the shape of an inner cut-out 14a of the second, outer segment 14. The shape of the inner cut-out 14a of the outer segment 14 is preferably that of a rectangle (14c', 14c") with a partial circular portion in the two opposite sides of greater length of the rectangle. The preferred shape of the rectangle should be substantially that of a standard rectangular container so that a container of such shape could be readily retained therein, as illustrated in FIG. 5. The partial circular portions contained within two sides of the rectangle 14b', 14b", as described above, form a complete, imaginary circle for retaining circular containers therein. The circular containers, for example, to be retained by the outer segment will have a larger diameter than those retained by the inner segment. (See, FIG. 2)

In addition, it should be recognized that a single segment having a cut-out (14a) shaped, as described above, for the outer segment constitutes a separately patentable embodiment of the present invention in and of itself.

The segments of the present invention are preferably made of a flexible, high-surface friction material and, most preferably, made of high density, cross-linked polyethylene and may be of either open cell or closed cell. This material reduces condensation and imparts a gripping tendency by the invention upon the containers so retained in the appropriate cut-outs of the segments.

FIG. 2 is a perspective view of the container holder 10 of FIG. 1, in complete form, in use, placed on the dashboard 20 of an automobile and retaining a cup 22 within the circular portion 14b', 14b". Inner segment 12 is removed from outer segment 14 prior to use in this case and is either discarded or retained for future use.

FIG. 3 is an elevational view, taken in cross-section, of the container holder 10 of FIG. 2. The lower surface of outer segment 14 is affixed to dashboard 20 via a layer of adhesive 16. Any conventional adhesive may be used for such purpose and the ultimate decision of adhesive would be expected to depend upon the nature of the material to which container holder 10 is to be affixed.

The outer segment 14 is required to have an adhesive layer 16 on its lower surface. It is optional as to whether inner segment 12 is provided with a similar adhesive layer. This is because the inner segment will be retained in place and effectively affixed to the intended surface via the affixation. Commercial manufacture of the container holder of the invention is most efficiently performend by providing an adhesive layer to the entire lower surfaces of both segments and allowing, or otherwise instructing, the user of the article to expose only the adhesive of the outermost segment. By placing (or exposing) adhesive on solely the lower surface of the outermost segment, removal and replacement of the one or more inner segments is able to be carried out with greater ease. (In interpreting the appended claims, it should be understood that placement of an adhesive layer on solely the lower surface of the outermost segment shall be deemed equivalent to placement of adhesive on the lower surfaces of all segments in instances where the eventual user is not expected to expose the adhesive of segments other than the outermost segment.)

FIG. 4 is a prospective view of the container holder 10 of FIG. 2, retaining the cup 22 in the circular cut-out of the first, inner segment 12. Inner segment 12 is contained within cut-out 14a of outer segment 14. The adhesive on the lower surface of both segments, or of simply the outer segment 14, affixes container holder 10 to dashboard 20.

FIG. 5 is a prospective view of the container holder 10 of the present invention affixed to dashboard 20 and retaining a rectangular container 24 in the cut-out 14a of the second, outer segment 14. In the instance, inner segment 12 is removed and container 24 is retained with the rectangular portions 14c', 14c" of cut-out 14. Segment 14 is affixed to dashboard 20 by adhesive layer 16, as best shown in FIG. 3.

It should be apparent to those of ordinary skill in the art that numerous modifications may be made to the container holder of the present invention. For example, the number of segments can be increased to more than two or the holder can comprise solely a segment with a cut-out similar to outer segment 14. Additionally, inner segment 12 can be provided with a cut-out similar to that of outer segment 14. Alternatively, still, outer segment 14 can have a circular cut-out (as shown for inner segment 12), while inner segment 12 as a cut-out similar to that shown in the drawing figures for outer segment 14. It is also possible to provide either, both or all segments with cut-out of various other shapes, such as hexagonal or octagonal.

Finally, it should be understood that the container holder of the present invention may support a wide variety of containers including, for example, coffee mugs, soda cans and bottle, conically-shaped containers, etc.

While several embodiments of the present invention have been shown and described, it will be apparent to those of ordinary skill in the art that many modifications may be made to the present invention without departing from the spirit and scope thereof.

What is claimed is:

1. An article restrainer, comprising:

a first, inner segment made of a flexible, high-surface friction material having a circular cut-out therein capable of receiving an article;

a second, outer segment with a lower surface made of a flexible, high-surface friction material having a cut-out therein, said cut-out of said second segment having the shape of a rectangle with at least two opposing sides of said rectangle each having a partial circular portion which forms a complete imaginary circle, said rectangular portion being capable of receiving an article of rectangular shape and said partial circular portions, in combination with one another, being capable of receiving an article of circular shape, said first, inner segment being capable of being retained within the cut-out of said second, outer segment; and, an adhesive layer on, at least, the lower surface of said outer segment for affixing said article restrainer to a surface.

2. The article restrainer according to claim 1, wherein said flexible, high-surface friction material of said inner segment and of said outer segment is a material selected from the group consisting of high-density, cross-linked polyethylene, natural rubber, synthetic rubber, a silicone, latex, natural sponge, polyvinyl chloride, polyurethane.

3. The article restrainer according to claim 2, wherein said high-density, cross-linked polyethylene of said inner segment and of said outer segment have a density of approximately 3 lbs./sq. ft.

4. The article restrainer according to claim 2, wherein said high-density, cross-linked polyethylene of said inner segment and of said outer segment have a cross-linkage of approximately 40%.

5. The article restrainer according to claim 1, wherein said inner segment has a lower surface with an adhesive layer provided thereon.

* * * * *